(12) United States Patent
Murphy (10) Patent No.: US 8,768,559 B1
(45) Date of Patent: Jul. 1, 2014

(54) LINE PROJECTION SYSTEM

(71) Applicant: Brenda Murphy, Richmond, KY (US)

(72) Inventor: Terry Murphy (73) Assignee: Qunomic Virtual Technology, LLC, Lexington, KY (US)

( * ) Notice: Subject to any disclaimer, the term of this patent is extended or adjusted under 35 U.S.C. 154(b) by 48 days.

(21) Appl. No.: 13/746,870

(22) Filed: Jan. 22, 2013

(51) Int. Cl.
*G01C 22/00* (2006.01)
*G05D 1/02* (2006.01)

(52) U.S. Cl.
CPC .................................. *G05D 1/0236* (2013.01)
USPC .............................. 701/28; 700/258; 250/221

(58) Field of Classification Search
USPC ........................ 701/28, 23; 250/221; 700/258; 340/825.72
See application file for complete search history.

(56) References Cited

U.S. PATENT DOCUMENTS

| | | | |
|---|---|---|---|
| 3,744,586 A * | 7/1973 | Leinauer ........................ 180/401 |
| 4,328,545 A * | 5/1982 | Halsall et al. .................... 701/23 |
| 6,129,025 A * | 10/2000 | Minakami et al. .......... 104/88.01 |
| 2001/0006426 A1* | 7/2001 | Son et al. ......................... 359/15 |
| 2002/0157562 A1* | 10/2002 | Akiyama ................. 104/130.01 |
| 2005/0187678 A1* | 8/2005 | Myeong et al. .................. 701/27 |
| 2007/0179690 A1* | 8/2007 | Stewart ............................ 701/23 |
| 2013/0226344 A1* | 8/2013 | Wong et al. .................... 700/258 |

* cited by examiner

*Primary Examiner* — Helal A Algahaim
*Assistant Examiner* — Shardul Patel
(74) *Attorney, Agent, or Firm* — J. Wiley Horton (57) ABSTRACT

A laser-based line projection system that is suitable for selectively placing lines on a floor surface, such as a factory floor. Several projectors are used in a typical installation. Each projector includes a laser directed through a diverging lens to create a planar projection of laser light. The planar projection creates a bright line when it falls on a surface. Each projector is optionally equipped with a movable mask that alters the angle of divergence for the laser light after it passes through the cylindrical lens. This component allows the projector to vary the length of the line projected.

14 Claims, 9 Drawing Sheets

LINE PROJECTION SYSTEM

CROSS-REFERENCES TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of marking. More specifically, the invention comprises a system for projecting an illuminated line on a floor. The line may serve to guide automated vehicles, to segregate one area from another, and for many other purposes.

2. Description of the Related Art

A line placed on a floor surface can serve a wide variety of purposes. A simple use for such a line is separating two areas. An example of this would be identifying a boundary between an area where fork trucks are allowed to operate and another area where they are not. In recent years, lines placed on a floor surface have also been used to define a route for an automatically guided vehicle ("AGV").

AGV's routinely handle transport tasks in modern factories. Many AGV's are equipped with a forward and downward facing optical system that is able to track a contrasting line placed on the floor. Other marking may be used to identify "stops" that an AGV makes. "Stops" may also be identified using radio frequency or other signals.

Many methods are used to place lines on a floor surface. Paint-based striping machines, similar to those used on roadways, can accurately place a painted line. In more recent years, however, the lines are created using a specialized tape. The tape includes an adhesive on one side, allowing it to be stuck to the floor. A non-linear path may be created by splicing together linear portions. Some tapes can even be laid in a curved path, provided that the radius of curvature is not very small.

The tapes themselves fall into two broad categories. The first category is based on magnetism. These tapes include a ferromagnetic substance. A magnetic sensor on the AGV provides steering input on the basis of its proximity to the tape. Magnetic tapes may even include differently-polarized sections allowing the implementation of other features.

The second category is based on optical contrast. Such tapes usually provide a bright and/or reflective surface that contrasts with a background surface. An example is a bright yellow tape placed on a dull concrete surface. The AGV includes a light source and an optical sensor that "sees" the contrast between the tape and the background surface and uses this value to guide the AGV's steering.

The use of optical tape has well known disadvantages. The tape of course resides on the factory floor, where it is subjected to a punishing volume of traffic. The tape may become scuffed and torn. In prolonged use it may simply wear through in sections. The solution to these problems is to periodically renew the tape. Many users lay multiple tape layers on the same path until the height of the tape becomes a problem. Then the entire "stack" is removed, the surface is cleaned, and a new initial layer of tape is laid. This is a time consuming and labor intensive process.

It would therefore be desirable to provide a guidance method that allows the use of existing AGV guidance hardware but eliminates the known disadvantages of the prior art optical tapes. The present invention provides such a solution.

BRIEF SUMMARY OF THE PRESENT INVENTION

The present invention comprises a laser-based line projection system that is suitable for selectively placing lines on a floor surface, such as a factory floor. Several projectors are used in a typical installation. Each projector includes a laser directed through a diverging lens to create a planar projection of laser light. The planar projection creates a bright line when it falls on a surface. Each projector is optionally equipped with a movable mask that alters the angle of divergence for the laser light after it passes through the diverging lens. This component allows the projector to vary the length of the line projected.

In use, two or more projectors are used to project a bright line on the floor. The projectors are preferably controlled so that the line each projector creates may be switched on and off. The length of each line may also be varied. By switching various projectors on and off—and optionally varying the length and end positions of the lines created—a control system can produce a wide variety of lines on the factory floor. These lines may be used to control AGV's, with the switching functions taking the AGV's along different desired "tracks."

The projected lines may also be used for simpler purposes, such as designating exclusion areas. The lines may optionally be pulsed or moved to attract the attention of factory workers.

| REFERENCE NUMERALS IN THE DRAWINGS | |
|---|---|
| 10 | line projector |
| 12 | laser |
| 14 | beam |
| 16 | diverging lens |
| 18 | projection axis |

-continued

| REFERENCE NUMERALS IN THE DRAWINGS | |
|---|---|
| 20 | divergence angle |
| 22 | mask |
| 24 | chassis |
| 26 | screw actuator |
| 28 | gear motor |
| 30 | guide shaft |
| 32 | message projector |
| 34 | threaded receiver |
| 36 | mask opening |
| 38 | control board |
| 40 | housing |
| 42 | window |
| 44 | mounting bracket |
| 46 | projected line |
| 48 | mask |

DETAILED DESCRIPTION OF THE INVENTION

Figure 1:
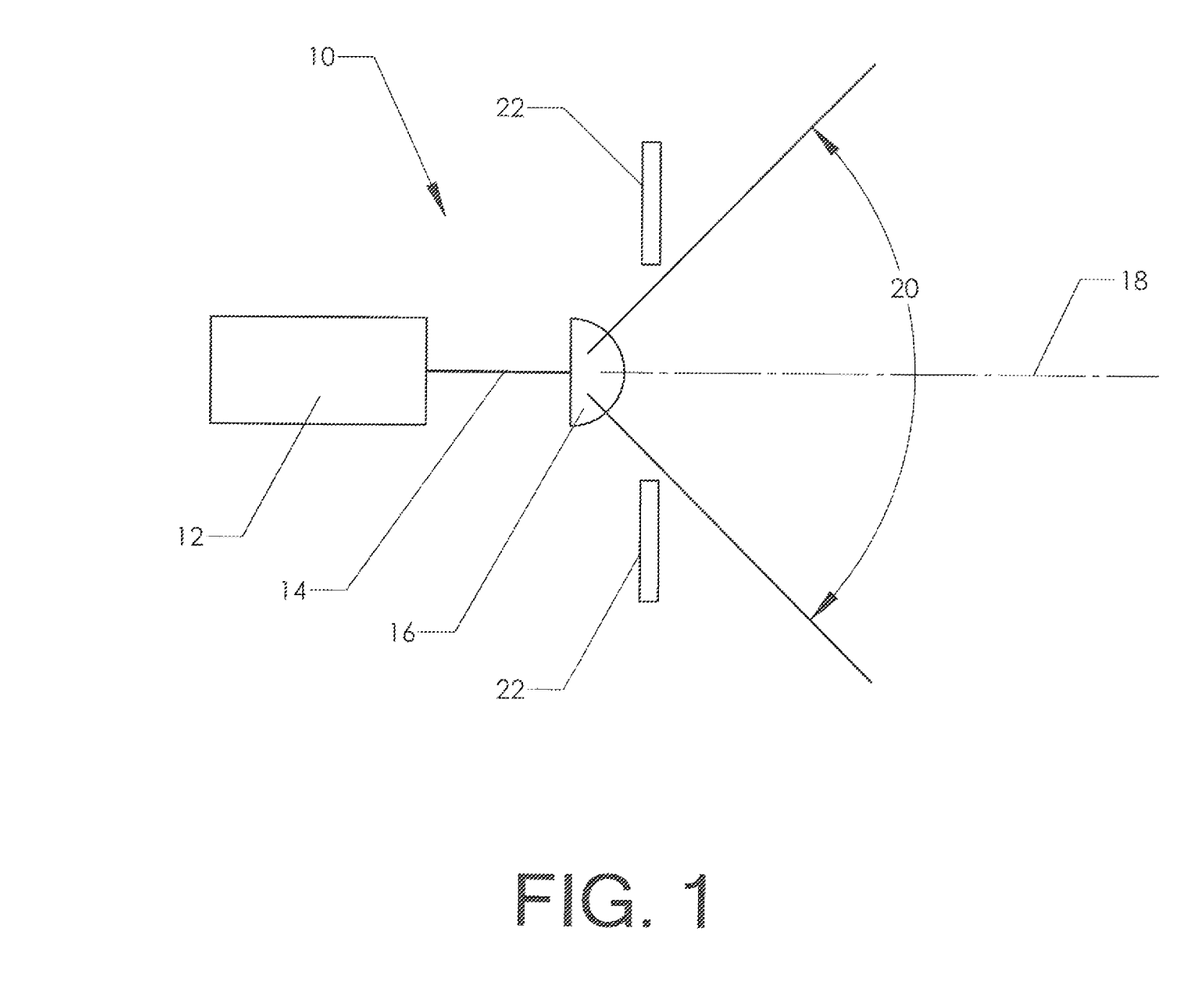
FIG. 1 is a schematic view, showing the basic components of the optical system contained within a line projector.

FIG. 1 shows a simplified depiction of a line projector 10. Laser 12 produces beam 14 of coherent light. A diverging lens is placed in the path of the beam. The term "diverging lens" refers to any component capable of spreading the beam into a plane of light. A common example is a cylindrical lens. In the embodiment of FIG. 1, diverging lens 16 is placed in the path of the beam. The diverging lens creates a diverging "fan" of coherent light that diverges at an angle 20 with respect to projection axis 18.

As is well known to those skilled in the art, when a laser beam strikes a surface it creates a brilliant point of light (produced by the backscatter phenomenon inherent in diffuse reflection). When a diverging fan such as shown in FIG. 1 strikes a surface it creates a line. The line that is thereby projected is used in the present invention.

It is preferable to include a mask 22. A mask is simply an occluding device with an opening to allow all or part of the diverging fan of laser light to pass. The reader will note that if the mask of FIG. 1 is moved to the right with respect to the orientation of the view, it will begin to occlude part of the diverging fan of laser light. Such a mask may be made movable, so that its position may be adjusted and then locked in order to create a desired divergence angle 20. Such a mask may also be movable during operation in order to vary the divergence angle while a line is being projected by the device.

Figure 2:
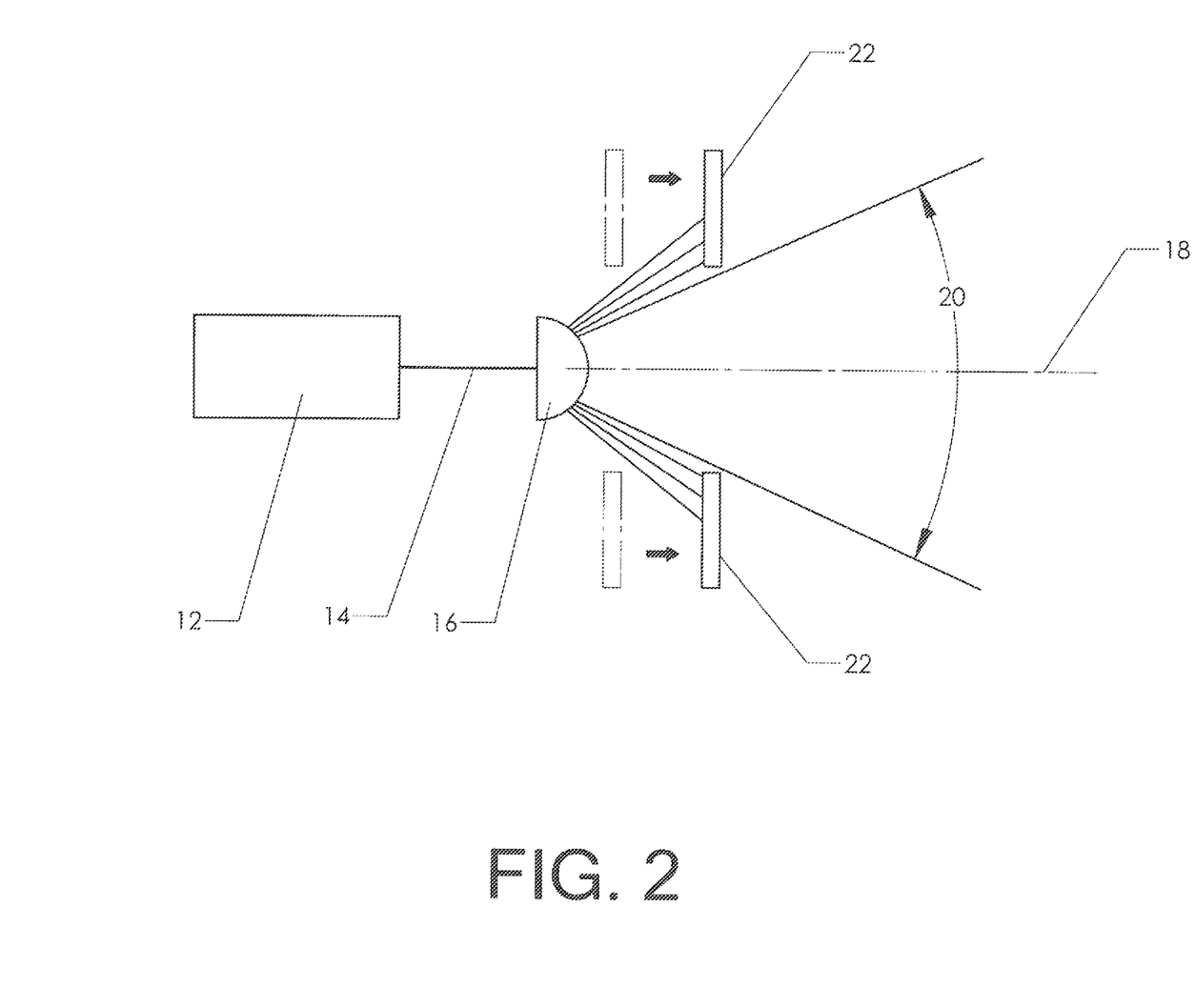
FIG. 2 is a schematic view, showing the use of a movable mask within the optical system.

FIG. 2 shows the same embodiment after mask 22 has been moved to the right with respect to its position in FIG. 1. The reader will note that the mask now occludes a portion of the diverging fan of laser light so that divergence angle 20 is significantly reduced.

The configuration shown in FIGS. 1 and 2 may be physically realized using a virtually endless variety of hardware. The reader's understanding may benefit from the disclosure of one physical realization, and this is provided in FIG. 3. Line projector 10 is built on chassis 24. Laser 12 is attached to the chassis, as is control board 38. Mounting bracket 44 is provided so that the chassis may be easily attached to an external mounting point (such as a column or ceiling beam).

Figure 3:
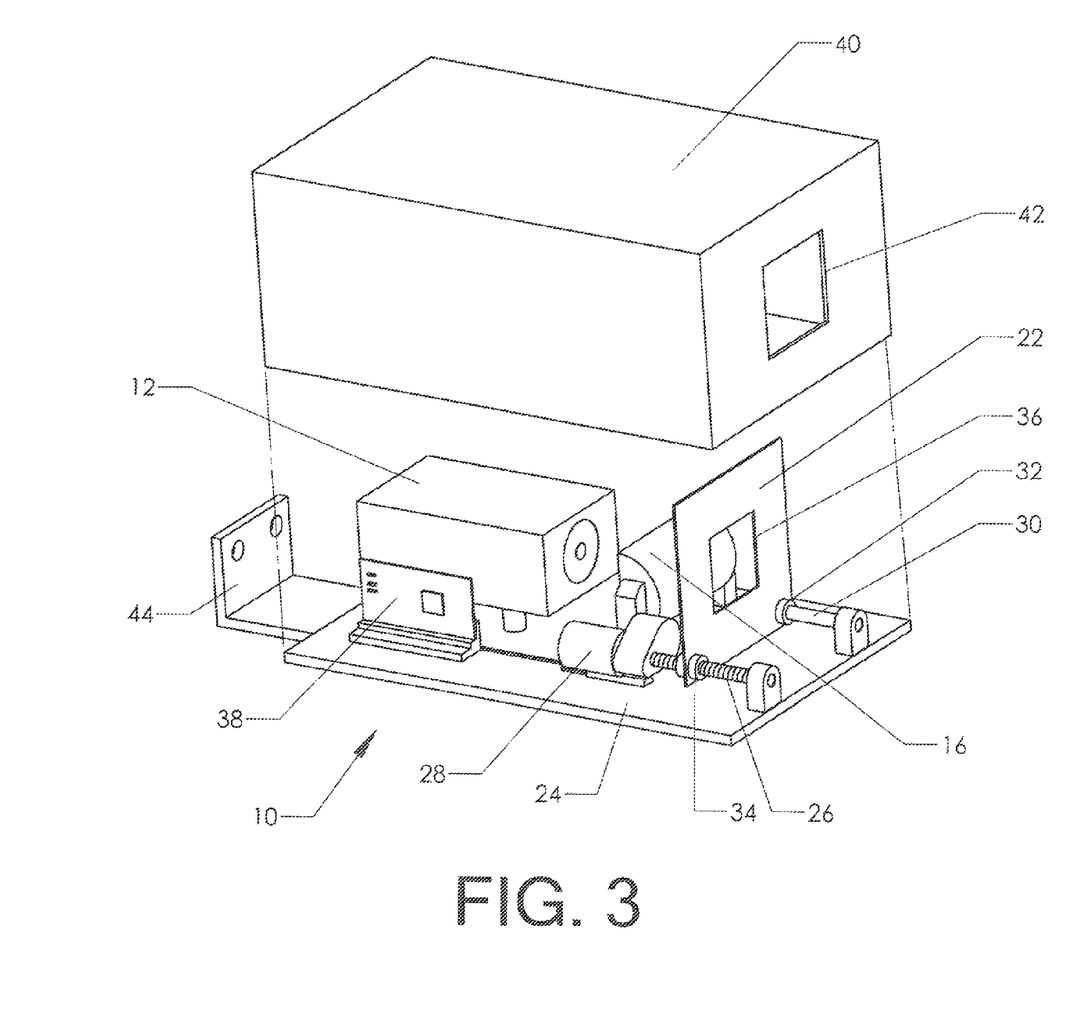
FIG. 3 is an exploded perspective view, showing an exemplary embodiment of a line projector used in the present invention.

Diverging lens 16 is mounted in a fixed position with respect to laser 12. Mask 22 is a simple opaque plate having mask opening 36. Mask 22 moves along screw actuator 26 and guide shaft 30. The mask includes bearing 32 and threaded receiver 34. Bearing 32 slides smoothly over guide shaft 30. Threaded receiver 34 is threadedly engaged with screw actuator 26.

Gear motor 28 is connected to chassis 24. It selectively turns screw actuator 26. The gear motor is preferably able to spin screw actuator 26 in either direction. The operation of the motion control system for mask 22 will therefore be familiar to those skilled in the mechanical arts. Whenever the gear motor is actuated, it will propel mask 22 either forward or backward (depending on the direction of rotation of the screw actuator). The inclusion of bearing 32 riding on guide shaft 30 ensures that the orientation of the mask remains approximately perpendicular to the laser beam.

Gear motor 28 is preferably placed under the control of control board 38. The control board can selectively activate the gear motor to move the mask and alter the angle of divergence for the fan of laser light passing through mask opening 36. A control signal can be used to initiate this action. Such a control signal could be sent using a hard-wired connection, a radio frequency connection, an optical connection, or any other suitable means.

Housing 40 covers and protects the internal components. Window 42 in housing 40 may be a simple opening or may be a transparent substance such as glass. The internal components are not generally visible once the unit is sealed and installed.

Figure 4:
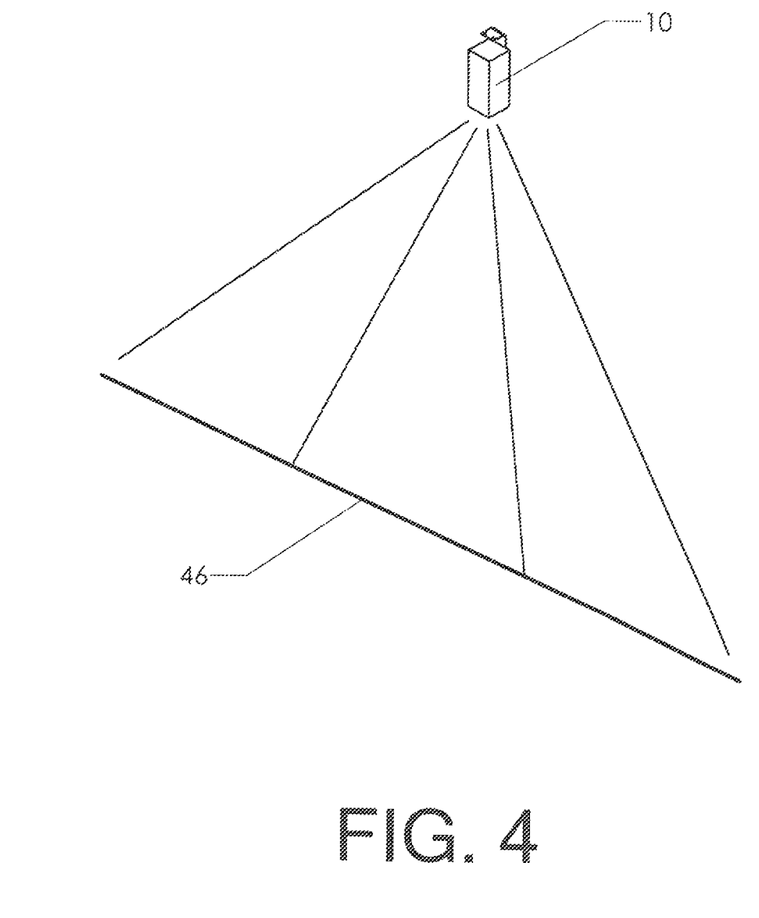
FIG. 4 is a perspective view, showing a single line projector in operation.

FIG. 4 shows a perspective view of line projector 10. The projector is oriented to project a diverging fan of coherent light downward toward a floor surface. When the diverging fan strikes the floor surface it creates projected line 46. The diverging fan of coherent light is bounded by a first diverging boundary on one side and a second diverging boundary on the other side. The locations of the first and second diverging boundaries create the locations of the end point for each end of projected line 46.

As will be explained subsequently, it is sometimes important in the present invention to vary the location of the diverging boundaries and the resulting length of the projected line. One way to do this is to move a single mask—such as shown in FIG. 3-along the laser's axis of projection. The effect of such a movement—assuming a symmetrical mask—is to symmetrically vary the length of projected line 46 shown in FIG. 4. In other applications it will be desirable to allow the two diverging boundaries to be adjusted independently.

Figure 5:
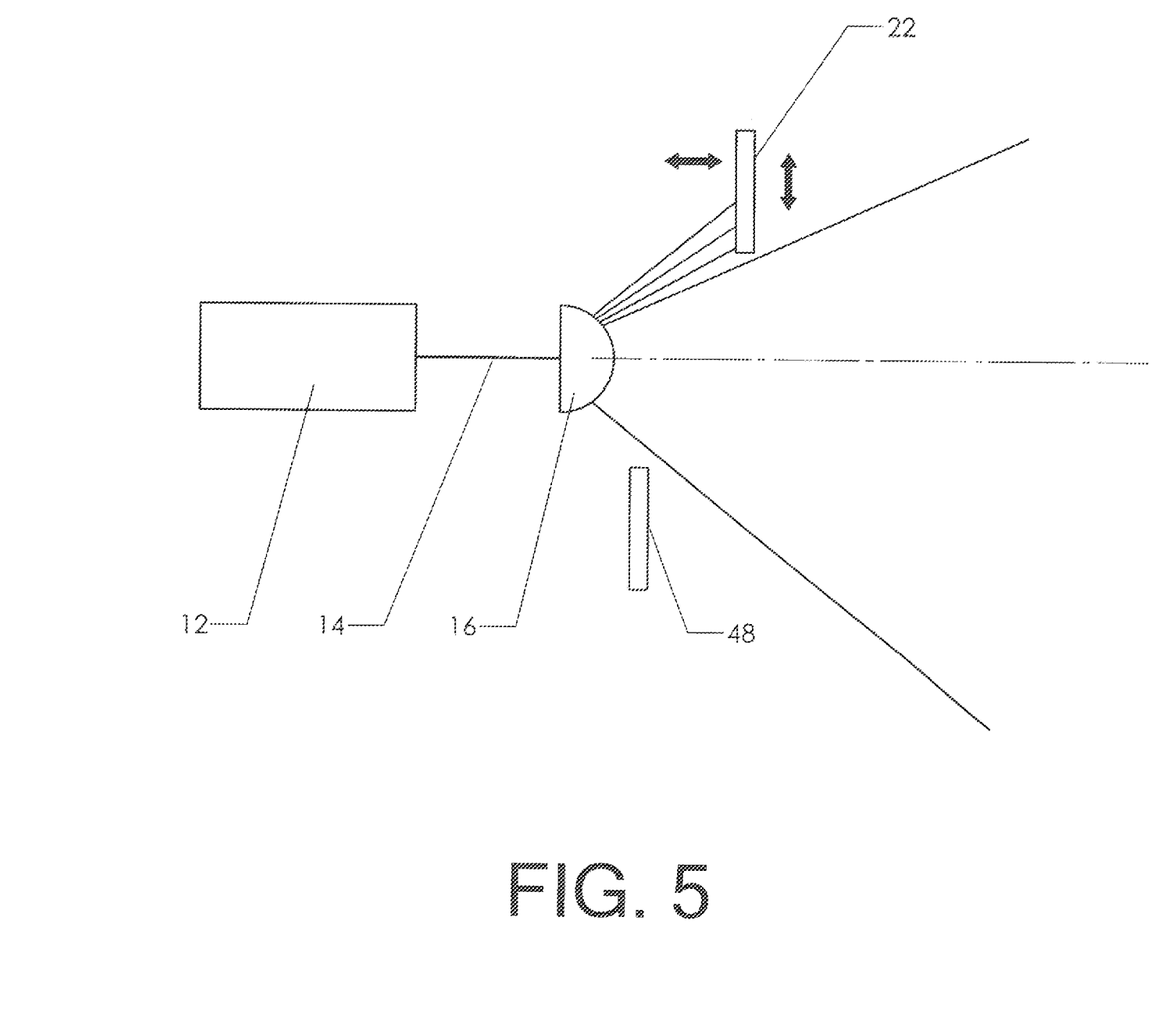
FIG. 5 is a schematic view, showing the use of two masks that can be moved independently.

FIG. 5 shows a simplified depiction of an embodiment that is capable of independently adjusting the position of the two diverging boundaries. It does so by using a mask that is split into two independent portions. Mask 22 is movable in at least one of the two directions indicated by the orthogonal reciprocating arrows. The motion of mask 22 defines the location of the diverging boundary that is visible above the projection axis of the beam 14 in the view (Directional terms such as "above" should be understood to refer to the orientation shown in the view and should not be viewed as limiting).

A separate mask 48 is movable as well. Its location defines the second diverging boundary. By independently moving the location of the two masks, the location of the two diverging boundaries for the "fan" of laser light can be adjusted independently. This fact means that the two end points for the line projected on a surface can be adjusted independently.

One of the practical uses of the line projection system is the creation of a line on a factory floor that is used to guide AGV's. It is preferable to provide a plurality of line projectors that can be selectively switched on and adjusted to provide a line of considerable length. It is also preferable to provide alternate paths by switching on and off selected line projectors. In the course of these "switching" operations it will sometimes be necessary to adjust the location of one or both endpoints of a projected line. The embodiment of FIG. 5 allows this functionality.

Those skilled in the art will recognize that there are many other approaches that may be used to vary the projected line.

As one additional example, an asymmetric diverging lens (such as a parabolic lens) may be mounted on a rotating axis that is perpendicular to the laser beam. Rotating the asymmetric diverging lens will then alter the location of the end points for the projected line.

Figure 6:
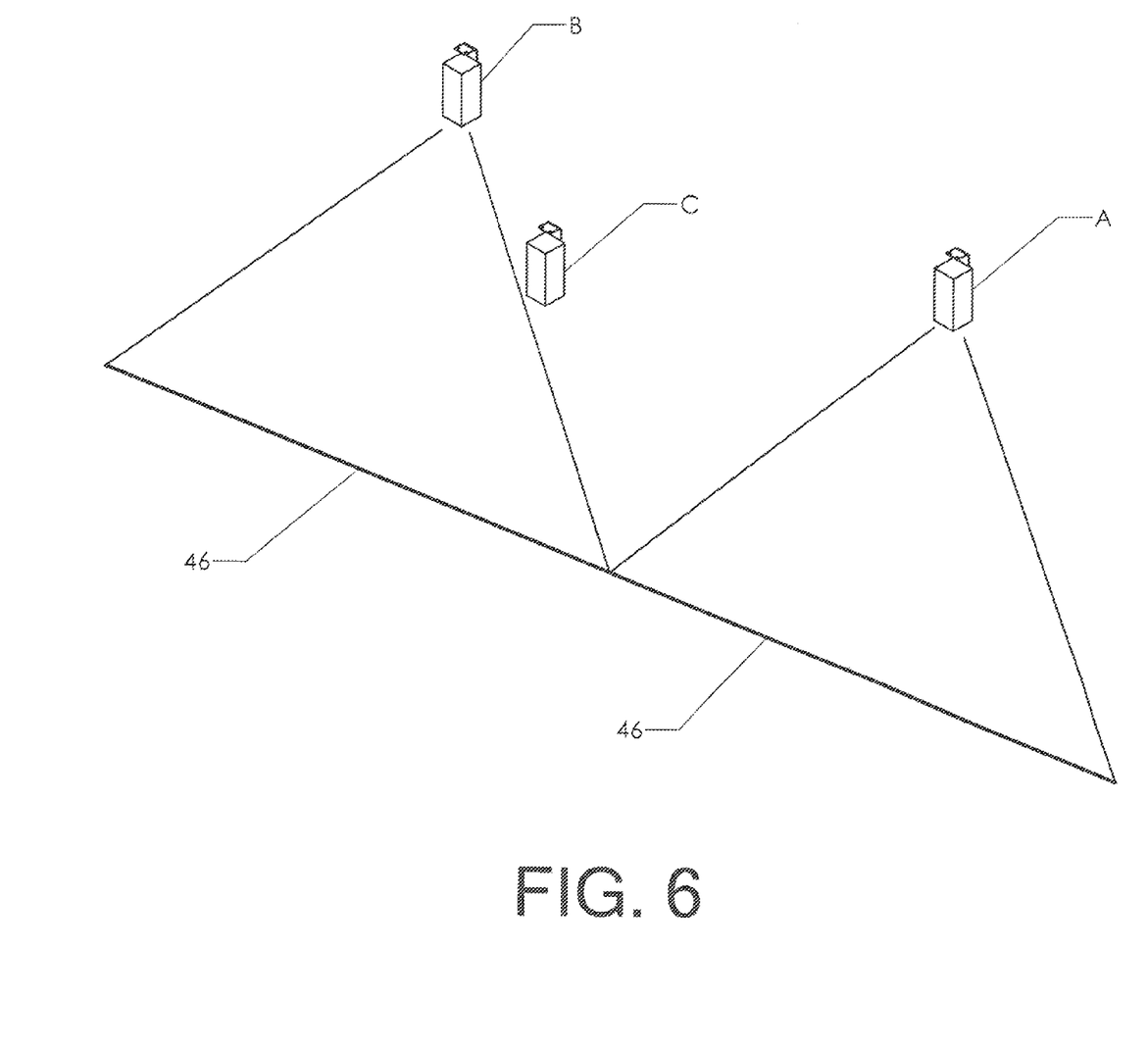
FIG. 6 is a perspective view, showing the use of two line projectors to create a continuous and straight projected line.

FIG. 6 shows the use of three line projectors labeled A, B, and C. The line projectors in this particular example are attached to the ceiling and pointed toward the floor. Line projectors A and B are switched on in FIG. 6, while line projector C is switched off. Line projectors A and B each create a projected line 46 on the floor. The line projectors are preferably adjusted so that the projected lines appear to be continuous, although some overlap is allowable and some gap is allowable.

Two or more projected lines formed as shown in FIG. 6 create a defined path. One common use for such a defined path is the guidance of AGV's. Using optical guidance hardware and software, an AGV can follow along the defined path in the same way it can follow a contrasting line that is taped on the floor.

Figure 7:
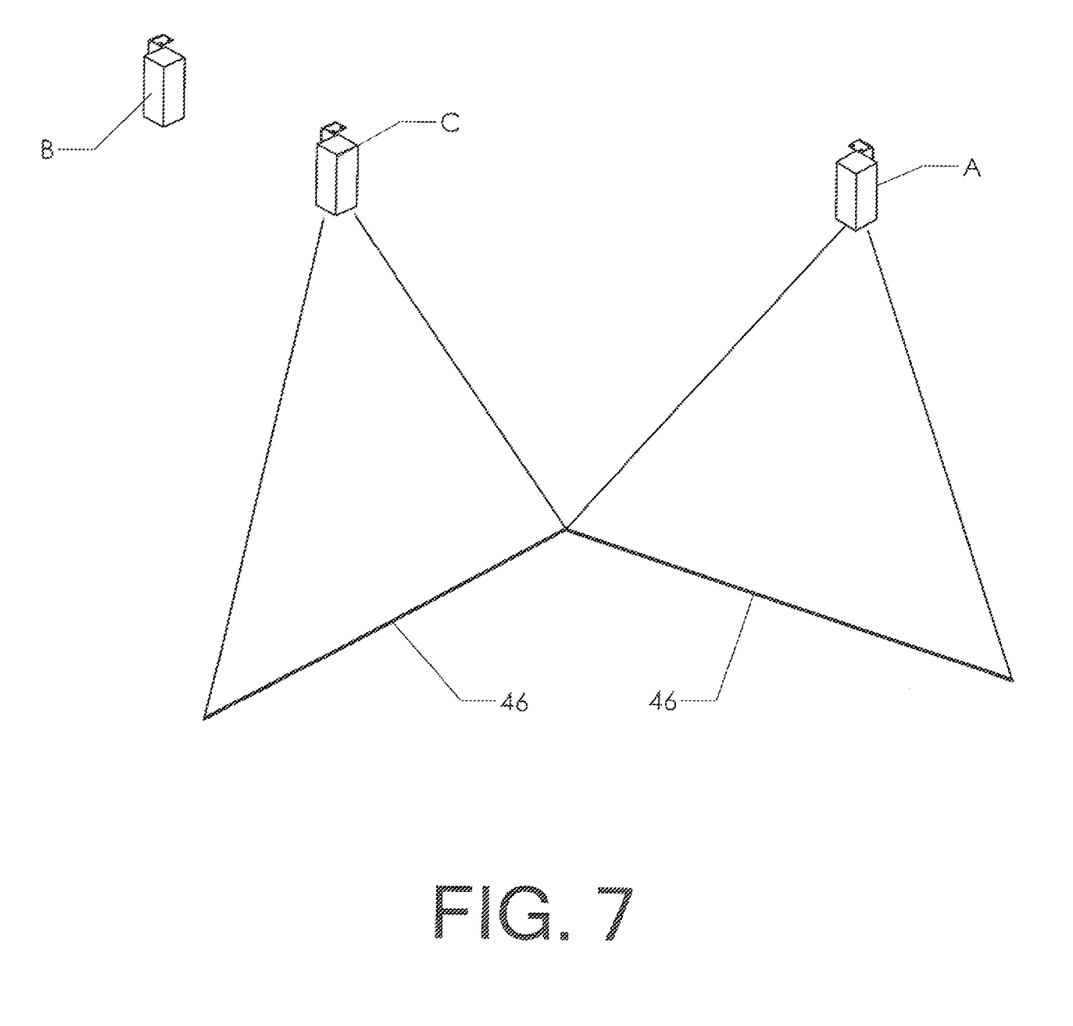
FIG. 7 is a perspective view, showing the use of two line projectors to create a continuous but non-straight projected line.

The defined path may easily be altered by switching and/or adjusting the line projectors. In FIG. 7, line projector B has been switched off while line projector C has been switched on. Two projected lines 46 are produced, but the defined path has been altered. In the case of FIG. 7, the defined path now includes a ninety degree bend.

Figure 8:
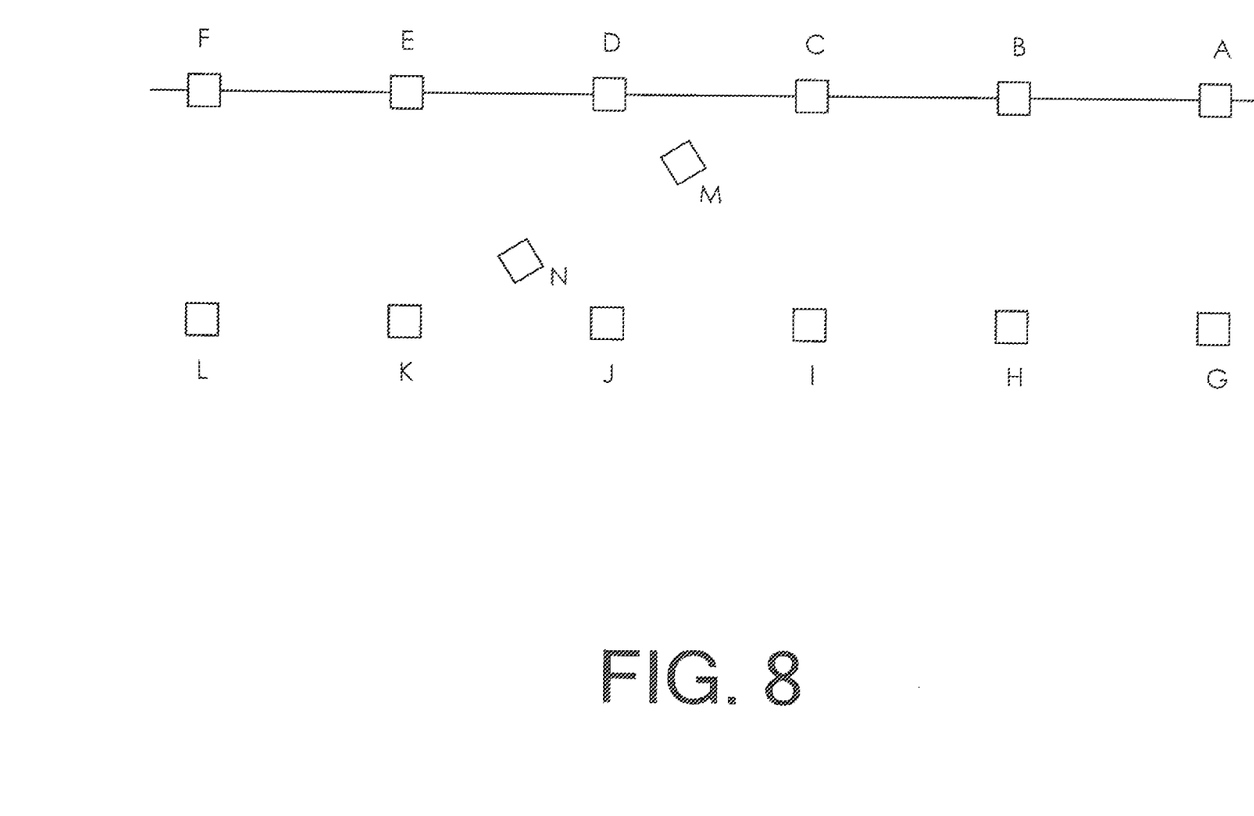
FIG. 8 is a plan view, showing the use of multiple projectors to create a guide "track" across a factory floor.
Figure 9:
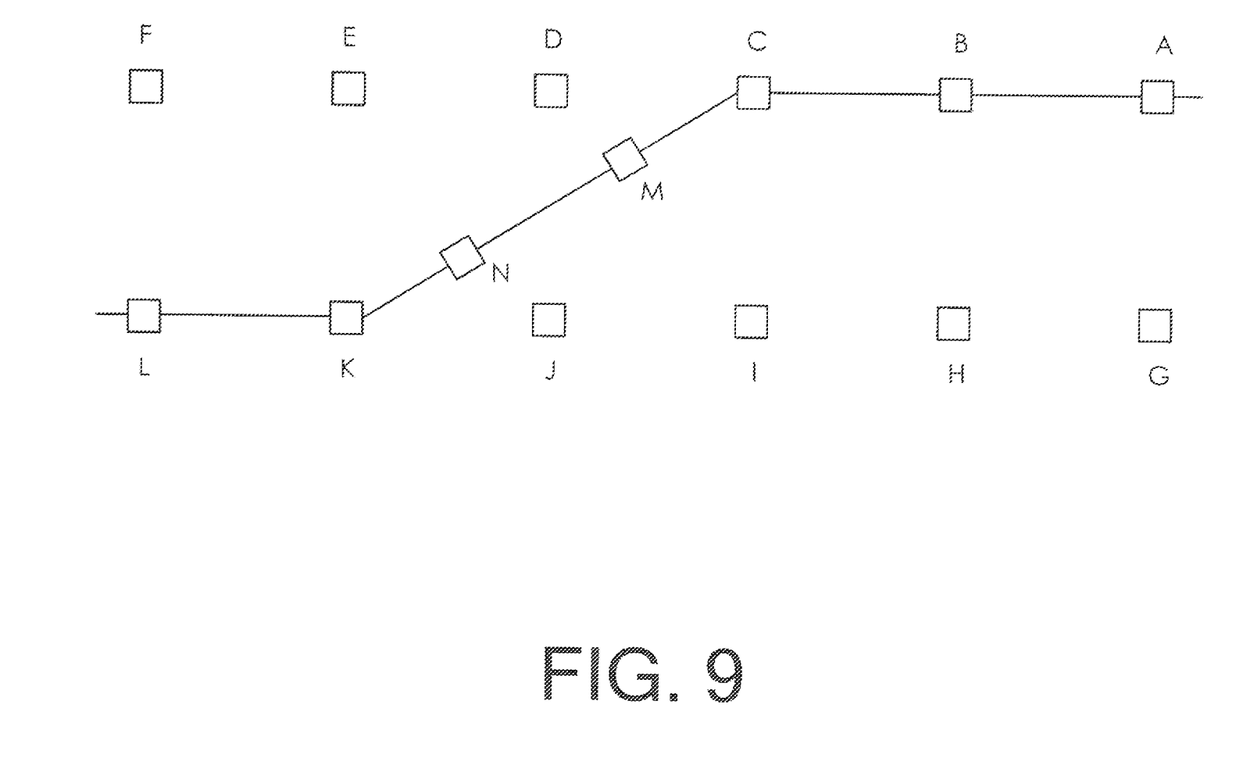
FIG. 9 is a plan view, showing the selective switching of the projectors to create an alternate "track."

FIGS. 8 and 9 serve to illustrate how groups of line projectors may be used to create a variety of changeable defined paths. Both FIGS. 8 and 9 present plan views of a factory floor. In FIG. 8, line projectors A, B, C, D, E, and F are switched on. Line projectors G, H, I, J, K, L, M, and N are switched off. The result is a defined path running from right to left in the view. An AGV approaching from the right will travel along the defined path to the left.

FIG. 9 shows the same view but with different line projectors turned on. In FIG. 9, line projectors A, B, C, M, N, K, and L are turned on. The other line projectors are turned off. The reader will observe how a different defined path is created. An AGV approaching from the right will now enter a diversionary path and exit along the line created by line projectors C, M, N, K and L.

The reader will thereby appreciate how differing defined paths can be created using groups of line projectors. Differing groups may include some of the same line projectors. For example, a first group might include line projectors A-F. A "switching group" includes line projectors C, M, N, and K. This group is called a switching group because it is activated to divert an AGV onto a different track in much the same way as a railroad switch diverts a train onto a different track. The switching group creates a "switch path" (The line traveling from line projector C to line projector K).

Many other details may be added to an operational AGV guidance system. It is preferable for the laser-based line projectors to be functional with prior art AGV systems designed to follow a taped line. Returning to FIG. 4, those skilled in the art will perceive an issue with this goal. Prior art AGV systems generally "look" for a contrasting line immediately in front of the vehicle. A vehicle traveling along projected line 46 creates a shadow. The vehicle will occlude a portion of the diverging fan of coherent light. If the angle of divergence created by a line projector is large, the AGV's shadow may occlude the portion of the projected line that is actively being used for guidance.

One way to address this issue is to keep the angle of divergence fairly small. This approach requires the use of a greater number of line projectors. A second approach is to adjust the two diverging boundaries according to the direction of AGV travel. If the AGV's only travel along a defined path in one direction—which is common—it is possible to take this approach. The diverging boundary that is projected in the direction from which an AGV approaches is given a relatively large angle of divergence so that it will project under the approaching vehicle and not be occluded. The opposite diverging boundary is given a smaller angle and may in fact be straight down from the line projector to the floor or may even be directed toward the direction from which an AGV approaches. This technique minimizes vehicle occlusion.

A third approach is to simply provide overlap between the projected lines from neighboring line projectors. In this approach, when a line projected from one line projector is in the shadow of the AGV a line in the exact same location is created by the neighboring line projector.

Of course, modifying the AGV guidance system can also solve many of these problems. It is possible to allow interruptions in the guidance line. During periods where the AGV "sees" no line, it is programmed to continue for a specified distance using its last steering input. The AGV thereby continues far enough to pick up the next projected line.

It is also possible to provide an optical guidance system that extends out the side of the AGV. Such a system does not cast a very long shadow and is therefore less susceptible to the problems associated with guidance systems located under the vehicle.

The optical systems thus described may be used to create switchable and adjustable combinations of linear paths. It is also possible to create arcuate paths. One approach to this goal is to use a diverging lens that is not perpendicular to the laser's axis of projection. Another approach is to use motion-controlled X and Y mirrors that reflect the beam in a defined path. At any instant in time the projection is a bright dot. However, the dot is moved so rapidly using the X and Y mirrors that it appears to create a continuous line on the floor.

In many applications the projected lines will be a simple substitute for a taped or painted line on the floor. However, the use of the line projectors allows considerably more flexibility.

Turning on and off versions switching groups can create various desired defined paths. In addition, simply switching off the line projectors in an area can control an AGV in that area. Many AGV's are programmed to stop when the guiding line is "lost." One could use a unified control system to switch off the line projectors in an area in order to stop a particular AGV. The AGV could then be restarted by switching the relevant line projectors back on.

It is also possible to conserve energy by only switching on the portions of a defined path that are needed at any given time. A vehicle proximity sensor can be used to determine roughly the location of an AGV. An example is the use of an ultrasonic emitter on the AGV and an ultrasonic receiver on each line projector. Each successive line projector in a defined path is only switched on when an AGV is approaching. Once the AGV departs the area of a particular line projector, the line projector is switched off again.

It is also possible to guide a particular AGV using other approaches. One example is the use of a pulsed binary code in the laser signal. A particular AGV can be addressed by a particular code. Returning to FIG. 8, one could use pulsed codes to keep more than one possible track active at any given time. For instance, line projectors A-F could pulse a first binary code. Line projectors M, N, K, and L could pulse a second binary code. An AGV programmed to "look" for the second binary code would then "know" that it needs to steer toward the line projected by line projector M (The length of the line projected by M is preferably adjusted so that it intersects the line projected by projectors A-F). The result is that only a particularly selected AGV would take the alternate course.

The use of laser backscatter modulated to pulse a defined binary code is known in the field of weapon targeting and other fields. While a discussion of the details of such an approach is beyond the scope of this disclosure, it is well known that an optical backscatter seeker can be configured to look for and respond to one or more specific codes.

The specific examples explained have pertained to AGV's but—as discussed initially—the present invention is useful for many other purposes. Returning briefly to FIG. 7, those skilled in the art will realize that an L-shaped projection such as shown could be used to define an exclusion area. For instance, it may be desirable to exclude all traffic from an area of a factory floor when a dangerous operation is occurring. Line projectors A and C would be switched on to project the lines and define the exclusion zone.

The line projectors may be combined with other technologies to reinforce the desired result. As an example, the control system for the line projectors may include a motion sensor that senses when a person or vehicle approaches the projected lines. Upon sensing such an approach the line projectors could flash the lines and the control system could also sound an audible warning.

Although the preceding description contains significant detail, it should not be construed as limiting the scope of the invention but rather as providing illustrations of the preferred embodiments of the invention. Those skilled in the art will know that many other variations are possible without departing from the scope of the invention. As an example, the simple planar masks shown in the disclosed embodiments could be cylindrical in shape. As a second example, the location of the diverging boundaries could be adjusted using masks that lie outside the housing rather than within it. Accordingly, the scope of the invention should properly be determined with respect to the following claims rather than the examples given.

Having described my invention, I claim:

1. A method for guiding an automatically guided vehicle along a floor, comprising: a. providing an automatically guided vehicle, said automatically guided vehicle including, i. a sensor for sensing a line on said floor, and ii. a steering mechanism that uses information from said sensor to steer said automatically guided vehicle along said line on said floor; b. providing a plurality of line projectors, wherein each of said line projectors includes, i. a laser emitting a beam, ii. a diverging lens in the path of said beam, wherein said diverging lens creates a diverging fan of coherent light from said laser, c. wherein at least one of said line projectors further includes, i. a mask positioned to occlude at least a portion of said diverging fan, ii. said diverging fan having a first diverging boundary, iii. said mask having a first side proximate said first diverging boundary, iv. said first side of said mask being movable with respect to said lens; d. mounting said plurality of line projectors so that said diverging fan of each of said line projectors is orientated toward said floor; e. switching on at least some of said plurality of line projectors including said at least one line projector having said movable mask, so that each of said diverging fan produces a projected line on said floor, with said projected lines joining to form a defined path; f. moving said first side of said mask within said at least one of said line projectors with respect to said diverging lens in said at least one of said line projectors, thereby altering a length of said projected line produced by said at least one line projector and altering a location of a first line boundary for said projected line produced by said at least one line projector; g. locating said automatically guided vehicle on said defined path; and h. activating said automatically guided vehicle so that said automatically guided vehicle travels along said defined path.

2. A method for guiding an automatically guided vehicles as recited in claim 1, wherein: a. said diverging fan in said at least one line projector has a second diverging boundary; b. said mask in said at least one line projector has a second side proximate said second diverging boundary; c. said second side of said mask in said at least one line projector is movable with respect to said diverging lens, with a motion of said second side of said mask being independent of a motion of said first side of said mask.

3. A method for guiding an automatically guided vehicle as recited in claim 1, wherein said diverging lens is a cylindrical lens.

4. A method for guiding an automatically guided vehicle as recited in claim 1, wherein: a. said plurality of line projectors is divided into a first group and a second group; b. said first group projects a first defined path; c. said second group projects a second defined path; and d. selectively switching on said first group or said second group in order to send said automatically guided vehicle down said first defined path or said second defined path.

5. A method for guiding an automatically guided vehicle as recited in claim 4, further comprising a switching group of line projectors, wherein when said switching group is switched on a switch path is created, said switch path connecting said first and second defined paths.

6. A method for guiding an automatically guided vehicle as recited in claim 1, further comprising turning off said plurality of line projectors, thereby stopping said automatically guided vehicle.

7. A method for guiding an automatically guided vehicle as recited in claim 1, further comprising after said step of turning on at least some of said line projectors, moving said first side of said mask with respect to said diverging lens in said at least one line projector one of said line projectors, thereby altering a length of said projected line produced by said at least one line projector.

8. A method for guiding an automatically guided vehicle along a floor, comprising: a. providing an automatically guided vehicle, said automatically guided vehicle including, i. a sensor for sensing a line on said floor, and ii. a steering mechanism that uses information from said sensor to steer said automatically guided vehicle along said line on said floor; b. providing a first line projector, including, i. a laser emitting a beam, ii. a diverging lens in the path of said beam, wherein said diverging lens creates a diverging fan of coherent light from said laser; c. providing a second line projector, including, i. a laser emitting a beam, ii. a diverging lens in the path of said beam, wherein said diverging lens creates a diverging fan of coherent light from said laser, iii. a mask position to occlude at least a portion of said diverging fan, iv. said diverging fan having a first diverging boundary, v. said mask having a first side proximate said first diverging boundary, vi. said first side of said mask being movable with respect to said lens; d. mounting said first and second line projectors so that said diverging fan of each of said line projectors is orientated toward said floor; e. switching on said first and second line projectors, so that each of said diverging fan produces a projected line on said floor, with said projected lines joining to form a defined path; f. moving said first side of said mask within said second line projector with respect to said diverging lens in said second line projector, thereby altering a length of said projected line produced by said second line projector and altering a location of a first line boundary for said projected line produced by said second line projector; g. locating said automatically guided vehicle on said defined path; and h. activating said automatically guided vehicle so that said automatically guided vehicle travels along said defined path.

9. A method for guiding an automatically guided vehicle as recited in claim 8, wherein: a. said diverging fan for said second line projector has a second diverging boundary; b. said mask for said second line projector has a second side proximate said second diverging boundary; and c. said second side of said mask is movable with respect to said diverging lens, with a motion of said second side of said mask being independent of a motion of said first side of said mask.

10. A method for guiding an automatically guided vehicle as recited in claim 9, further comprising moving said first side of said mask and said second side of said mask with respect to said diverging lens in said second line projector, thereby altering a length of said projected line produced by said second line projector, altering a location of said first line boundary, and altering a location of said second line boundary.

11. A method for guiding an automatically guided vehicle as recited in claim 10, wherein said location of said first or second line boundary is altered so that said projected lines from said first and second line projectors intersect.

12. A method for guiding an automatically guided vehicle as recited in claim 8, wherein said diverging lens in each of said line projectors is a cylindrical lens.

13. A method for guiding an automatically guided vehicle as recited in claim 8, wherein: a. said first line projector projects a first defined path; b. said second line projector projects a second defined path; and c. selectively switching on said first line projector or said second line projector in order to send said automatically guided vehicle down said first defined path or said second defined path.

14. A method for guiding an automatically guided vehicle as recited in claim 8, further comprising turning off said first and second line projectors, thereby stopping said automatically guided vehicle.

* * * * *